United States Patent [19]

Briefer

[11] Patent Number: 5,078,220
[45] Date of Patent: Jan. 7, 1992

[54] MULTIPLE SENSOR CAPACITIVE MEASUREMENT SYSTEM

[75] Inventor: Dennis K. Briefer, Berlin, Mass.
[73] Assignee: Setra Systems, Inc., Acton, Mass.
[21] Appl. No.: 565,633
[22] Filed: Aug. 10, 1990
[51] Int. Cl.⁵ .......................... G01G 3/14; H01G 7/00
[52] U.S. Cl. .................................. 177/210 C; 361/280
[58] Field of Search ........................ 177/210 C; 361/280

[56] References Cited

U.S. PATENT DOCUMENTS

| | | | |
|---|---|---|---|
| 4,512,431 | 4/1985 | Bloomfield | 177/210 C X |
| 4,679,643 | 7/1987 | Bove | 177/210 C |
| 4,917,199 | 4/1990 | Loshbough | 177/210 C |
| 5,006,952 | 4/1991 | Thomas | 361/283 |

*Primary Examiner*—George H. Miller, Jr.
*Attorney, Agent, or Firm*—Lahive & Cockfield

[57] ABSTRACT

An instrument includes multiple sensing elements of the variable-capacitance type. The sensing elements are placed by a switching network into a single capacitance sensing circuit, and those elements which are not active in the circuit at a given time are switched by another or the same switching network into a ground shunt. The switching is effected at a rate, in relation to the expected vibrational spectrum of the sensor system, to determine a set of readings which are essentially equivalent to a set of simultaneous capacitance measurements of the plural sensing element. A preferred system is a weight sensing system employing three or four load cells to support a scale platform.

11 Claims, 3 Drawing Sheets

MULTIPLE SENSOR CAPACITIVE MEASUREMENT SYSTEM

BACKGROUND

The present invention relates to electrically operated scales, and in particular to scales of the type wherein a variable-capacitance load cell is used to determine the weight on the scale.

In prior art constructions of smaller weighing devices, a yoke-like structural mechanism is provided to support the scale platform and to transfer the weight of the platform into a single load cell. The capacitance of this cell is then measured by a measurement circuit to provide an indication of the total load on the platform.

In the construction of larger scales, such as truck scales, it is known to support a platform by several, e.g., three or four, independent load sensor units and to separately measure the load on each sensor and sum the individual loads to determine the cumulative weight on the platform. In smaller scales, however, such as those which have a maximum load range under several kilograms or those intended to have an accuracy of several milligrams, this multiple-sensor construction is not generally employed. Rather, the aforementioned yoke-type or related beam or balance-type structures are used to convey the weight to a single sensor. Such intermediate mechanical structures are relatively costly, and may introduce frictionally-caused measurement errors and mechanical wear effects.

While the mounting yoke could be eliminated and simply replaced by a four-point platform mounting on four separate load cells, this entails providing four capacitance measuring circuits in order to determine the load at each cell at one point in time. To provide multiple sets of sensing circuitry as well as multiple load cells, however, would offset the savings achieved by elimination of the mechanical suspension structure.

SUMMARY OF THE INVENTION

Accordingly, it is an object of the invention to provide a multiple sensor capacitive measurement system of simplified design.

This is achieved in one embodiment of the invention by providing a measurement system wherein plural sensing elements are each switched by a switching network to become active elements of a single capacitive sensing circuit, and those elements which are not active in the circuit at a given time are switched by another or the same switching network into a ground shunt. The switching is effected at a rate, in relation to the expected vibrational spectrum of the sensor system, to determine a set of readings which are essentially equivalent to a set of simultaneous capacitance measurements of the plural sensing elements. A memory stores set point data for each sensor between its active duty cycles. A preferred system is a weight sensing system employing three or four load cells to support a scale platform.

BRIEF DESCRIPTION OF THE DRAWINGS

These and other aspects of the invention will be understood from the following description, taken together with illustrative figures, wherein.

DETAILED DESCRIPTION

Figure 1:
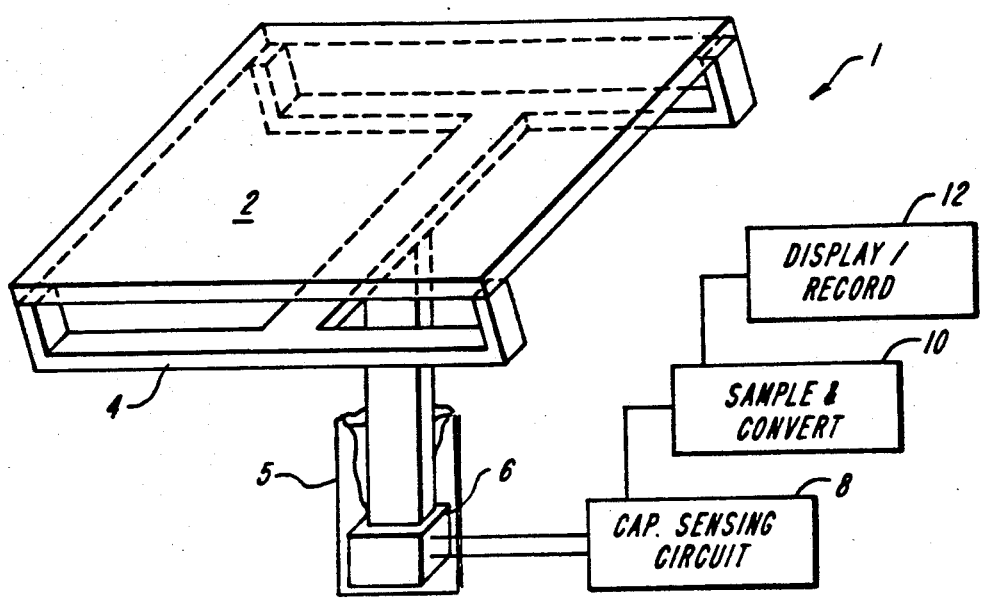
FIG. 1 schematically shows a prior art mechanical construction for a single sensor system.

A prior art scale 1 shown in FIG. 1 includes a platform 2 supported by a mechanical assembly 4,5 which directs the full weight of the scale platform onto a load cell 6 the characteristics of which vary in accordance with the load bearing against the top surface of the cell. For example, the load may compress a dielectric medium or displace a conductive diaphragm, to vary the capacitance of a portion of the sensor. A capacitance-sensing circuit 8 determines the capacitance of the cell, and a converter unit 10 converts the sensed capacitance to a weight value which is displayed on display 12. The circuit 8 generally detects the change in capacitance due to a load, and is thus relatively sensitive to stray capacitances such as parasitic or leakage capacitances of the wiring and system components.

Figure 2:
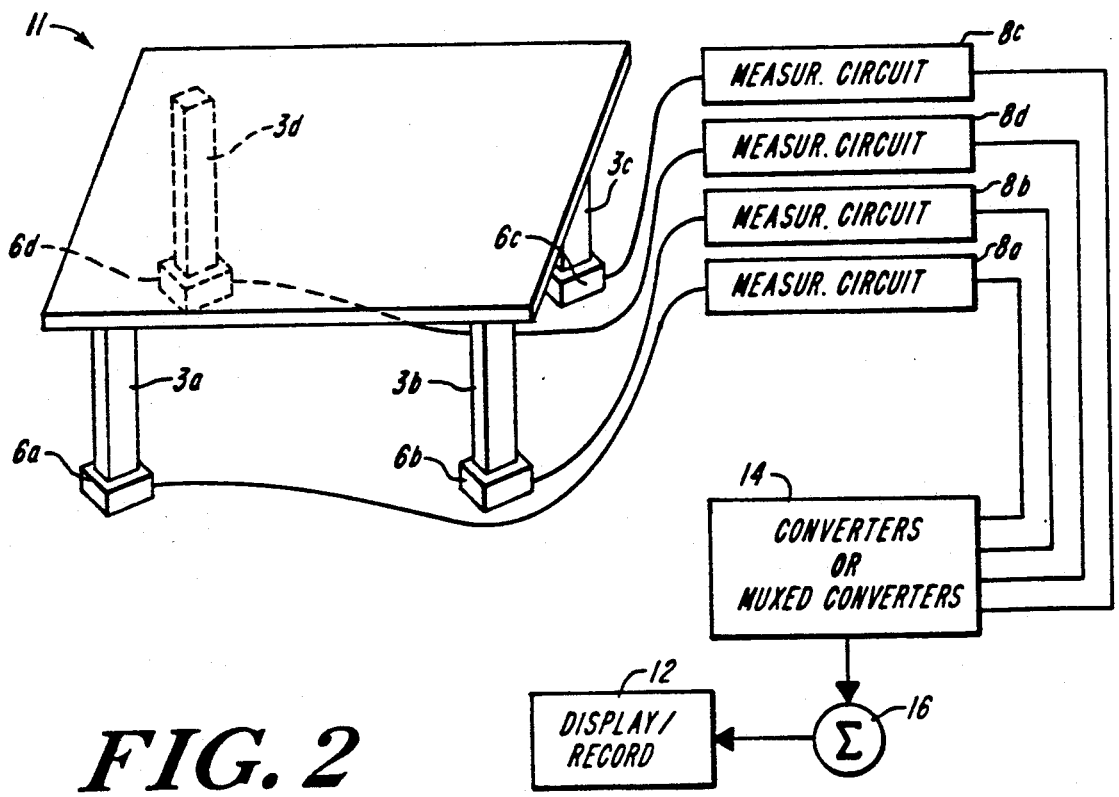
FIG. 2 schematically shows a prior art multi-sensor system.

FIG. 2 shows another scale design 11, wherein multiple load sensors 6a, 6b . . . 6d each with a separate load-transmitting column 3a, 3b, 3c, 3d support the scale platform 2. In this architecture, because of the aforesaid sensitivity to differing stray capacitances, each sensor is provided with its own capacitive sensing circuit 8a, . . . 8d. In this case, the four sensed capacitance values are converted by one or more capacitance-to-weight value converters 14, and the weight values are summed by a summer 16 before passing to display 12. The four capacitance values may each be separately converted to the digital weight value indicative of the weight on each separate sensor, or a multiplexer may successively pass the four different capacitance-indicating values to a single capacitance-to-weight converter. In either case, the set of four separate weight values is summed to display the total weight.

Figure 3:
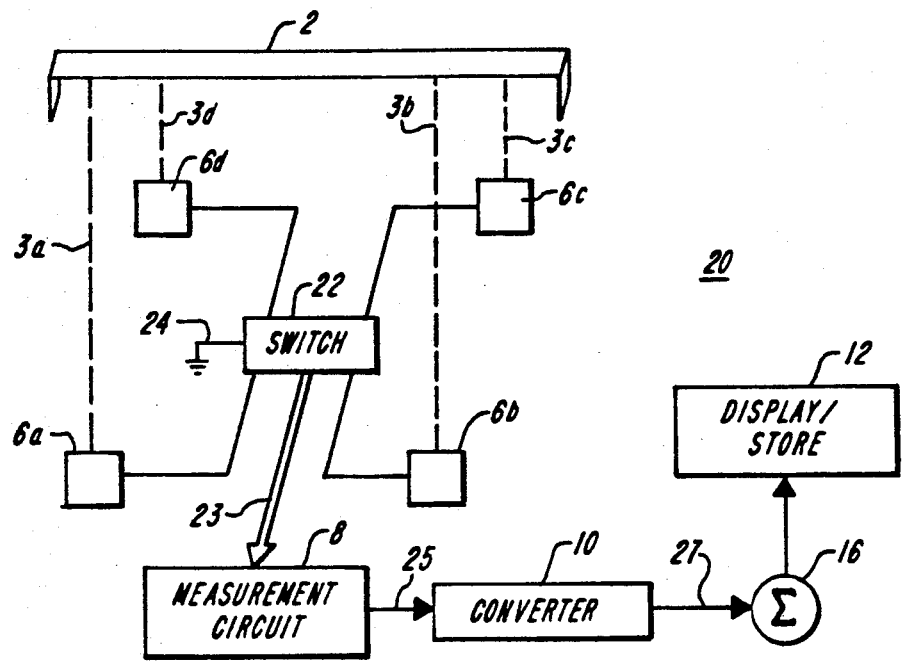
FIG. 3 shows a multi-sensor system according to the present invention.

FIG. 3 shows the improved weight sensing system 20 and circuitry according to the present invention. A plurality of supports direct the load on platform 2 to a plurality of sensor 6a . . . 6d, as in the scale of FIG. 2. Four sensors are shown, but practical embodiments may include three, five or another number of sensors. Each sensor has one terminal connected to a switching unit 22, which is centrally located with respect to and fixedly wired to the sensors 6a . . . 6d. Switch unit 22 is a four pole single throw switch unit, or, more generally, an n-pole single throw switch unit (for n sensors) in which, at each time only one sensor is connected to the switch active signal line 23 and the remaining three (or n-1) sensors are connected to the grounded line 24.

Switch active signal 23 connects to a single capacitance sensing circuit 8, the output of which passes on line 25 to a capacitance-to-weight value converter 10. Switch unit 22 cycles successively to interconnect each sensor unit as an active element of circuit 8, and thus to provide successive values along line 25 indicative of the capacitance of each of the sensors. These are converted to weight-indicating values by the converter 10 which provides the converted values on line 27. A summer 16 adds four successive values from converter 10 to provide a total weight value to display 12. Switch unit 22 is operated to switch any particular sensor into or out of the circuit only when that sensor is at ground potential. The effect of switching in this manner is that any stray capacitance at the input to an active sensor alters the time it takes for the sensor to charge, but does not introduce an offset or other complicating signal on line 23 to the capacitance sensing circuit 8, as the unit is switched between different sensors 6a, ... 6d.

Figure 4A:
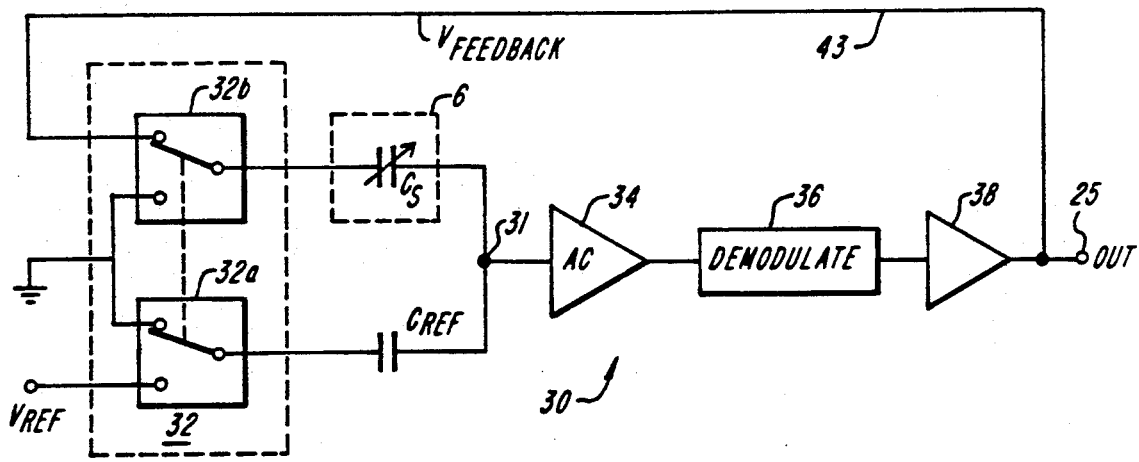
FIG. 4A shows a representative prior art capacitance sensing circuit.

FIG. 4A shows a practical embodiment of a conventional circuit 30 for determining the capacitance of a variable capacitance sensing element 6 such as one of elements 6a ... 6d. In this circuit a variable capacitance sensing element 6, acting as a sensing capacitor $C_s$ is placed in series with a fixed reference capacitor denoted $C_{REF}$. A switching unit 32 consists of a reference switch 32a and a sensor switch 32b which, in alternate switching cycles first apply a constant "reference" voltage $V_{ref}$ to $C_{REF}$ while grounding the sensor $C_s$, then apply a feedback voltage to the sensor while grounding $C_{REF}$. This periodic reversal of polarity along the two legs of the series-coupled capacitor pair $C_{REF}$ and $C_s$ results in a fluctuating charging and discharging across their junction 31, i.e., creates a varying AC signal at the junction 31 of the sensor $C_s$ and $C_{REF}$.

This signal is amplified, demodulated, and processed by elements 34,36,38 to produce a feedback voltage on line 43 which maintains the signal at 31 stationary. The demodulator may include a gated sampling circuit which detects the signal voltage or slope, or integrates the signal voltage, during a fixed short time interval following switching. In either case the feedback loop raises or lowers $V_{feedback}$ to maintain the sampled signal value at junction 31 stationary. Preferably a null signal is maintained at the junction.

Figure 4B:
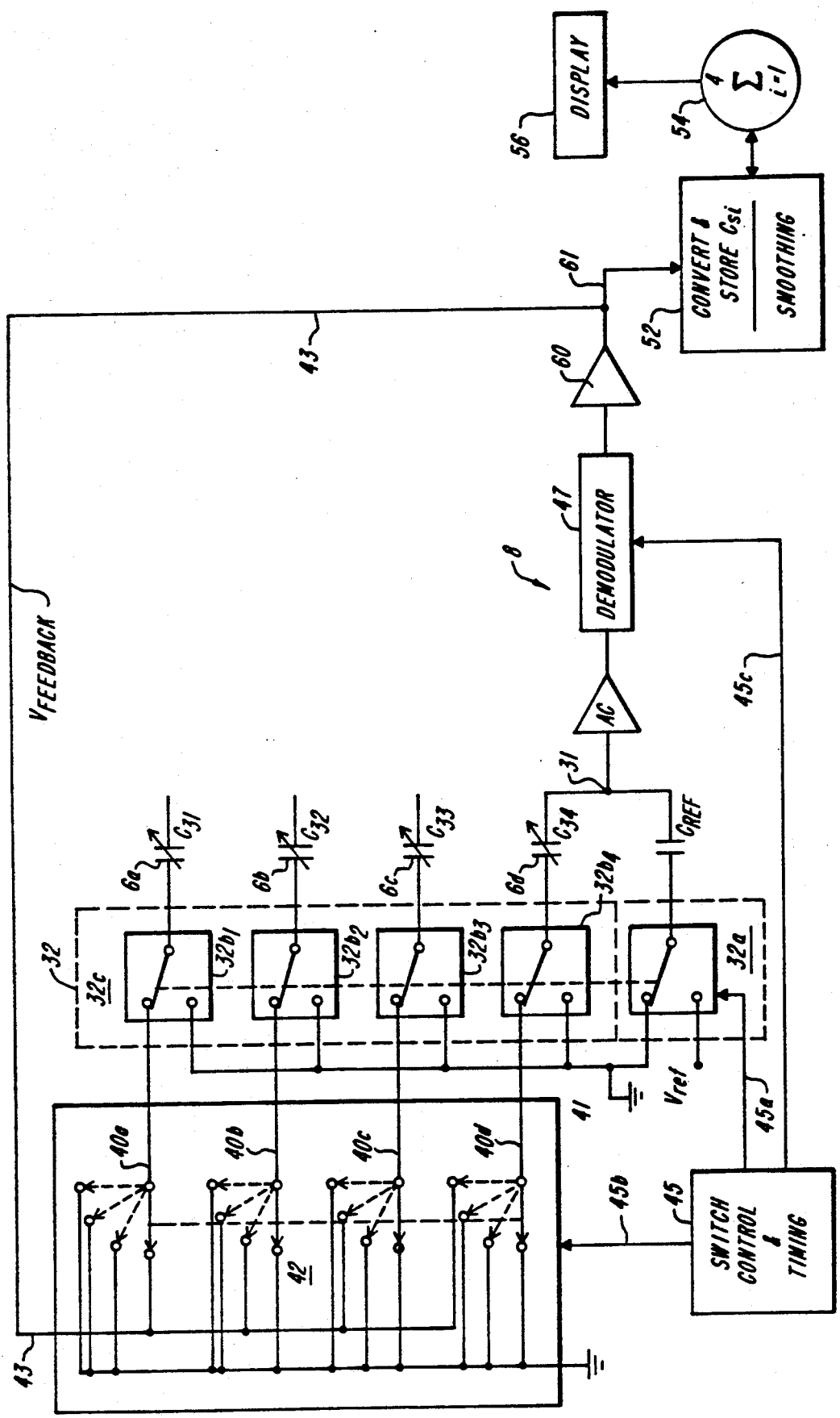
FIG. 4B shows a suitable sensing circuit for use in the embodiment of FIG. 3.

FIG. 4B illustrates a capacitance sensing circuit based on the circuit of FIG. 4A and incorporating features according to the invention for accurately sensing the capacitance of four different sensors 6a ... 6d, denoted $C_{s1}$, $C_{s2}$, $C_{s3}$ and $C_{s4}$. In this circuit a single reference capacitance $C_{REF}$ is fixedly connected at junction 31 to all four sensor capacitances, and a pair of switch units 32a, 32c of a network 32 operate synchronously to either ground the second end of $C_{REF}$ while connecting the second ends of each $C_s$ to a respective line 40a, 40b, 40c or 40d, or to connect the second end of $C_{REF}$ to $V_{REF}$ while connecting the second ends of all sensor capacitors to ground line 41. Switch 32c as shown, consists of four separate switches $32b_1$, $32b_2$, $32b_3$, $32b_4$ each of which is identical to switch 32b of FIG. 4A. Each of these switches is connected to one sensor, and all operate synchronously in parallel and have their non-grounded pole 40a ... 40d connected to a second switching network 42 which cyclically switches each one of the lines 40a ... 40d between ground and $V_{feedback}$. A switch control 45 synchronizes the operation of switches 42, 32 such that in each switching cycle of switch 32 wherein $C_{REF}$ is grounded, switch 42 grounds three of the sensors while applying $V_{feedback}$ to the fourth sensor.

Specifically, switch control 45 actuates line 45a to alternately connect the voltage and ground terminal of switches 32a, 32c of switch 32. In each non-grounded cycle of switch 32c, a second control line 45b actuates the different gangs of a further switch 42, to ground three of the lines 40a, 40b, 40c, 40d while connecting the fourth line from one "active" sensor to feedback line 43 of the sensing circuit. Preferably, the switch timing control unit first grounds the non-active sensors, and next after a brief interval to allow circuit stabilization, connects the remaining sensor to line 43 for a defined time interval. In selecting which sensor to connect to the feedback line 43, the switch control 45 cyclically selects the line 40i from first, second, third and then fourth sensor so that any sequence of four successive switching cycles results in the production of one measurement from each sensor. Switch 42 may be implemented using one of the CMOS multi-channel analog switching chips of the MM54HC4051 family of multiplexers made by National Semiconductor.

In addition to switch 42 and control 45, the circuitry includes a voltage-to-weight value converter 52, a summer 54 and a display 56, corresponding to elements 10, 16, 12 of FIG. 3.

Demodulator 47 receives timing signals on line 45C synchronized in relation to the operation of switch arrays 32, 42, and the demodulated signal is amplified by amplifier 60 with a gain that is selected so that the output signal fed back on line 43 maintains the detected signal at junction 31 stably nulled. This has the result that only small or negligible offsets in signal values arise between different measurement cycles.

The amplified demodulated signal on line 61 is converted by output processor 52 to a sensed weight signal corresponding to the detected capacitance value for each switching cycle, and a memory in the processor stores the weight values as they are developed. A summer 54, illustratively shown as a separate element, sums four weight values to produce a total weight value presented on display 56 as a visible output. The summer 54 may be included with the signal conversion processing and memory in processor 52. Processor 52 may further implement additional processing, such as numerical smoothing of successive corresponding weight values, to eliminate vibrational or noise induced fluctuations in the displayed weight.

For high precision weight measurements, the switching cycles are preferably effected at a sufficiently high rate that the series of four consecutive measurements may be treated as simultaneous. In particular, a complete set of four load cell capacitance measurements is preferably taken in a time interval which is less than the period of a characteristic resonance frequency of the scale assembly. Since a scale resonance is generally below several hundred Hz, this requires that each load cell be measured in under approximately a millisecond. As discussed above, such filtering or smoothing processing function is programmed into processor 52.

In this manner, a single sensing circuit is fixedly connected with a plurality of capacitive sensing elements, and each of these elements is energized to intermittently constitute an active element which is series coupled with a reference capacitor of the circuit while the remaining elements are effectively removed from the measured circuit. The described construction avoids the effects of varying stray capacitances which, with a different switching mechanism, would otherwise render the capacitive sensing inaccurate or make the measurement of a stationary signal infeasible with a single sensing circuit.

It is not necessary that two switching networks 32, 42 be employed as shown. The use of a separate two-state switch 32 and four-state switch 42 was illustrated to more clearly show that of the eight switching states employed, four are identical. These are the first, third, fifth and seventh states, each of which connect $C_{REF}$ to $V_{REF}$ and all sensors to ground. By employing two switches 32, 42 the switch controller for switch 42 may be a simple counter which develops a cyclic set of two bit control words from the successive control signals provided by prior art circuitry for actuating the switches 32a, 32b of FIG. 4A. In an alternative embodiment, however, switch portion 32c is simply replaced by switch 42, and the control circuitry 45 then includes slightly more complex logic to decode eight successive switching cycles to effect the connections described above. A third embodiment may operate by successively sampling and holding the signal from each of the four sensors $CS_i$, with a fast feedback loop multiplexed between the sensors to null each one with respect to a common reference measurement. In this case, the $C_{REF}$ measurements preferably do not alternate with each $CS_i$ measurement, but alternate with a group of all $CS_i$ measurements, and the measurements are taken sufficiently close in time to provide an accurate reference. Such a sampling protocol may be appropriate, for example, in a barometric sensing system where a relatively homogeneous pressure function is expected.

The actual behavior of each $CS_i$ in the circuit is affected by stray capacitances which may be modeled as a first resistance shunted across the sensor. These two resistances affect the output signal waveform from the sensor by introducing voltage decay and an initial voltage spike, respectively. In a preferred embodiment of the invention, the demodulator minimizes the effect of switching transients by selectively sampling the output of the amplifier connected to reference junction 31 at a time halfway between the switching-in of the reference and the switching-in of the sensing capacitor. Preferably the feedback voltage in line 43 is adjusted to null the demodulated signal, and the input signal is sampled during a relatively long interval, e.g., the middle third of the switching interval, about a nominal output signal zero crossing. This avoids transient spikes at the start of the interval, minimizes the shunt resistance effect and smooths out the effects of any high frequency noise appearing on line 31.

The invention being thus described with reference to an exemplary embodiment, variations and modifications will occur to those skilled in the art, and all such variations and modifications are considered to be within the scope of the invention, as defined by the claims appended hereto.

What is claimed is:

1. A sensing system comprising
    a plurality n>1 of variable-capacitance sensing elements operatively connected in an instrument for each sensing a physical parameter,
    a single capacitance-measuring circuit having an input, an output terminal and means for sensing the capacitance at said input and providing an indication of said capacitance at said output terminal,
    a switching network having plural switches for interconnecting each said sensing element at different times as an active element of the capacitance-measuring circuit,
    said switching network being operative to interconnect at successive times each said sensing element to said circuit while interconnecting with ground the n-1 sensing elements other than said sensing element, and
    output means for determining the magnitude of the physical parameter as a composite function of n successive indications at said output terminal.

2. A sensing system according to claim 1, wherein said switching network at successive times alternately connects a said sensing element and a reference capacitor to said circuit.

3. A sensing system according to claim 1, wherein the output means includes means for summing signals representative of force.

4. A sensing system according to claim 3, wherein the output means includes a display of weight.

5. A sensing system according to claim 4, wherein n equals three or four.

6. A sensing system according to claim 1, wherein said switching network is a CMOS analog switching network.

7. A sensing system according to claim 1, wherein said switching network successively interconnects each said sensing element to said circuit in a cyclic order in successive switching cycles.

8. A sensing system according to claim 1, wherein said output means provides a null seeking feedback signal to said switching circuit.

9. A sensing system according to claim 1, wherein each said sensing element has a first end fixedly connected with said sensing circuit, and a second end which is switched by said switching network between ground and a feedback line of said circuit.

10. A sensing system according to claim 9, wherein said switching network connects the first ends of all n sensors to ground while connecting the second ends of (n-1) sensors to ground, so as to effectively connect one sensing element as an active circuit element.

11. A sensing system according to claim 10, wherein said capacitance-measuring circuit includes means for sampling a voltage at a junction between said reference capacitor and a said sensing element during a sampling interval between times when said switching network switches.

* * * * *